Dec. 19, 1939.  D. C. STOCKBARGER ET AL  2,184,161
APPARATUS FOR SCANNING
Filed Nov. 11, 1936  4 Sheets-Sheet 2

Donald C. Stockbarger,
John L. Jones,
Inventors,
Delos G. Haynes,
Attorney.

Dec. 19, 1939.  D. C. STOCKBARGER ET AL  2,184,161
APPARATUS FOR SCANNING
Filed Nov. 11, 1936  4 Sheets-Sheet 3

Donald C. Stockbarger,
John L. Jones,
Inventors,
Delos F. Haynes,
Attorney.

Dec. 19, 1939.  D. C. STOCKBARGER ET AL  2,184,161
APPARATUS FOR SCANNING
Filed Nov. 11, 1936    4 Sheets-Sheet 4

Donald C. Stockbarger,
John L. Jones,
Inventors,
Delos G. Haynes,
Attorney.

Patented Dec. 19, 1939

2,184,161

UNITED STATES PATENT OFFICE 2,184,161

APPARATUS FOR SCANNING

Donald C. Stockbarger, Belmont, and John L. Jones, North Billerica, Mass., assignors to Stockton Profile Gauge Corporation, Lowell, Mass., a corporation of Massachusetts Application November 11, 1936, Serial No. 110,259

5 Claims. (Cl. 33—123)

This invention relates to apparatus for scanning, and with regard to certain more specific features, to apparatus for scanning and thereby measuring areas.

This application is in part a continuation of our copending application, Serial No. 90,261, filed July 11, 1936.

Among the several objects of the invention may be noted the provision of apparatus for scanning wherein scanning beams are projected against a surface the area of which it is desired to measure in such manner that they sweep the median lines of contiguous increments, such as concentric circular increments, on the surface, and so conducting the scanning that the lengths of said median lines on the surface are photoelectrically integrated into an accurate expression of the area of the surface; the provision of apparatus of the class described which produces results characterized by their high accuracy; the provision of apparatus of the class described which is designed, for example, to scan and record equal area increments on the surface to be measured in equal time intervals expressed as the motion of the scanning beams; and the provision of apparatus of the class described which is relatively simple in construction and operation. Other objects will be in part obvious and in part pointed out hereinafter.

The invention accordingly comprises the elements and combinations of elements, and features of construction and operation, which will be exemplified in the apparatus hereinafter described, and the scope of the application of which will be indicated in the following claims.

In the accompanying drawings, in which is illustrated one of the various possible embodiments of the invention, Fig. 1 is a diagrammatic layout of apparatus embodying the present invention;

Similar reference characters indicate corresponding parts throughout the several views of the drawings.

Figures 1, 10:
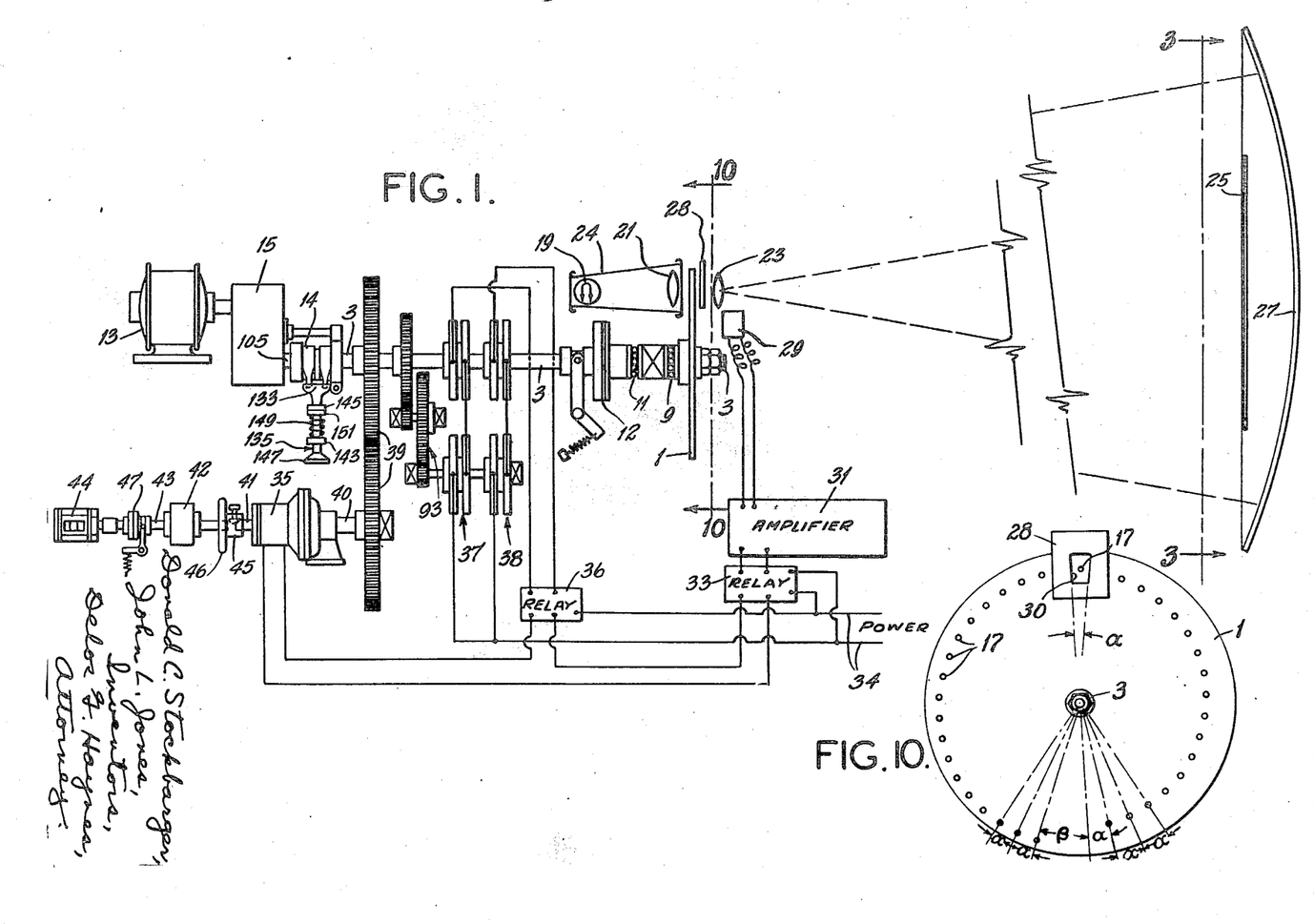

Referring now more particularly to Fig. 1, there is shown, in somewhat diagrammatic form, a layout of apparatus which embodies the present invention. Numeral 1 indicates a scanning disc, which will be described more fully hereinafter. The scanning disc 1 is plane and is mounted for rotation on a shaft 3 in such a manner that the plane of the disc 1 is perpendicular to the axis of the shaft 3. The shaft 3 is provided with thrust bearings 9 and 11 and with a substantially constant brake 12. The shaft 3 is driven by a motor 13 acting through a one-turn clutch 14 and a gear reduction box 15. The scanning disc 1 is provided with a spiral series of scanning holes 17 (see Fig. 10), the arrangement of which will be described in greater detail hereinafter.

Numeral 19 indicates a light source, such as an incandescent filament lamp. Numeral 21 indicates a lens, which is placed between the light source 19 and the disc 1, and which focuses an image of the light source 19 on a second lens 23, placed on the other side of the disc 1. The axis of the lens 21 coincides with the axis of the lens 23 which axis is parallel to the axis of the shaft 3 of the disc 1. A light shield 24 is desirably provided in such position as to enclose the light source 19 and lens 21, and prevent stray light from entering other parts of the apparatus. The image of the light source 19 should fill the second lens 23. The second lens 23 is arranged to focus an image of a hole 17 in the scanning disc 1 on a work piece 25, the area of which it is desired to measure. The work piece 25 is mounted at a predetermined distance from the lens 23 and with the plane of the work piece 25 parallel to the plane of the disc 1. Lenses 21 and 23 are not ordinarily single elements as shown diagrammatically in Fig. 1, but are preferably highly corrected compound lenses, such as microscope and camera lenses, for example. Behind the work piece 25, but as close to it as practically feasible, is placed a reflector 27, which, in the present embodiment, is a substantially spherical mirror. The reflector 27 is disposed to reflect light beams issuing from the lens 23 and not intercepted by the work piece 25, to a photosensitive device 29, which is desirably placed as close to the lens 23 as possible.

Between the lens 23 and the disc 1 is an opaque diaphragm or mask 28 (Fig. 10) of steel, for example, mounted in a fixed position preferably as close to the disc 1 as possible. The mask 28 has a sector-shaped aperture 30 therein which limits the lengths of the scanned paths in a predetermined manner. The size of the aperture 30 must be such that it is entirely within the so-called field of the lens 23, and is likewise such that its conical projection (using the optical center of lens 23 as an apex) on the plane of the work piece 25 (see Fig. 3, wherein this projected image of the aperture 30 is shown and indicated by numeral 32) is large enough to include any work piece it is desired to measure with the particular set-up of apparatus.

The size and position of the reflector 27 are such that its conical projection on the plane of the work piece 25 overlaps or extends beyond the said conical projection of the aperture 30 on the plane of the work piece 25.

The photosensitive device 29 is connected electrically to an amplifier 31, constructed to suit the characteristics of the particular device 29 employed, and the amplifier is in turn connected to a relay 33. The relay 33 is interposed in a circuit connecting power wires 34 to an electromagnetic clutch 35 through a second relay 36. Relay 36 is controlled by periodic timing devices 37 and 38 (hereinafter to be described) which are driven directly by the shaft 3. One end of the clutch 35 is driven by a shaft 40 through gears 39 in turn driven by shaft 3. Gears 39 are in a one to one ratio, so that shafts 3 and 40 rotate at the same speed. The other end of the electromagnetic clutch 35 drives a shaft 41, which drives a multiplier gear 42, which drives a shaft 43, which drives a rotation counter device 44. A releasable coupling 45 is provided between the electromagnetic clutch 35 and the shaft 41 for releasing the shaft 41 from the electromagnetic clutch 35 so that the counter 44 can be reset by means of a hand wheel 46 after the conclusion of a measurement of area. The multiplier gear 42 cooperates with the counter 44 to permit the measurement to take place in the desired units of area. A substantially constant brake 47 is provided on the shaft 43.

The multiplier gear 42 and the counter 44, taken as a unit, are carefully calibrated so that the rotation of the shaft 41 through a given angle from a well defined starting position produces a known change in reading of the counter 44, and the shaft 41 is provided with a coupling 45 and a hand wheel 46 for returning the shaft 41 to the starting position after the conclusion of an area measurement, said starting position being such that the counter reads "zero", for example, all backlash between shafts 41 and 43 having been removed by turning the hand wheel 46 in the forward direction. A brake 47 on shaft 43 cooperates in eliminating error due to backlash.

The electromagnetic clutch 35, as well as the counter 44, are of the customary construction finding use in this and allied arts. Suitable devices of this character are shown and described in greater detail, for example, in our copending application Serial No. 90,260, filed July 11, 1936.

The principles of operation of the apparatus thus described are presented in the following paragraph, assuming for the moment that the shaft 3 rotates at constant speed. As will be pointed out hereinafter, it is not necessary for the speed of the shaft 3 to be constant. However, this assumption is of aid in describing the general principles of operation of the apparatus.

The holes 17 in the scanning disc 1, passing between the lenses 21 and 23, project beams of light towards the reflector 27, each hole 17 producing one beam which sweeps the reflector as the disc rotates, and the successive holes 17 producing successive beams which sweep the combination of reflector 27 and work piece 25 at different angular positions. As long as these beams are not intercepted by the work piece 25, they are reflected back by the reflector to the photosensitive device 29, causing a response therein. The response of the photosensitive device is amplified by the amplifier 31, and the amplifier current holds the relay 33 (in the present embodiment) in open-circuit position, so that no power passes to the electromagnetic clutch 35. This means that no driving connection is had between the shafts 3 and 41, and hence the counter 44 does not operate. The instant, however, the beam of light (which will hereinafter be referred to as the scanning beam) is intercepted by the work piece 25, the actuating light on the photosensitive device 29 stops, thus causing the amplifier current to drop below the value required for holding the relay 33 in open-circuit position. The relay 33 thus closes, passing power to the electromagnetic clutch 35, which thereupon operates to drive the shaft 41 from the shaft 3. The counter 44 then commences to operate. The operation of the relay 36 is here disregarded, it being assumed that it does not interfere with the action of the relay 33 in passing power to the clutch 35.

The rotation of the counter 44, it will be seen, is proportional to the rotation of the scanner disc 1 during the time that the electromagnetic clutch 35 is operating. If, therefore, the rotation of the disc 1 can be made proportional to the length of the line on the work piece 25 traced by the moving scanning beam, then the value on the counter 44 will be true measure of the length of said line, and if it be assumed that the said line is the median line of an increment of constant width on the work piece, then the counter reading becomes an expression of the area of said increment.

For any one scanning beam, it will readily be seen that the above conditions are fulfilled, because the linear speed of a spot of light represented by the interception of the scanning beam on the work piece, as the beam sweeps across the piece, will be directly proportional to the angular speed of the disc 1. But a difficulty arises when successive scanning beams are considered. A beam from a scanning hole of lesser distance from the center of the scanning disc will move along the surface with the same angular speed as a beam from a scanning hole of greater distance (with the assumed constant angular speed of the disc 1), but due to its said lesser distance, the linear speed of the spot produced by the beam from the less distant hole on the work piece will be less than the linear speed of the spot produced by the beam from the greater distant hole. And, it will be seen, the linear speed of the spot is the true measuring factor of the area (or length of scanned line) on the work piece.

It will now be seen that if the holes 17 are arranged on the disc 1 in a spiral arrangement such that the radial distance between adjacent holes is equal (such as is the case with the common Nipkow scanning disc), an improper and incorrect area reading will result on the counter 44.

The present invention, in its present embodiment, disposes the holes 17 on the disc 1 in a spiral manner, but with the radial distance between adjacent holes gradually increasing as the holes progress towards the center of the disc. It can be shown mathematically that if the successive holes are so arranged that the following formula is complied with, then the counter 44 will accurately measure the area of the work piece. The formula is:

$$R_b = \frac{\sqrt{2(R_a + \tfrac{1}{2}h_a)^2 - (R_a - \tfrac{1}{2}h_a)^2} + R_a + \tfrac{1}{2}h_a}{2}$$

where $R_b$ is the sought distance of a hole $17_b$ from the center of the disc 1, $R_a$ is the distance of the next hole $17_a$ towards the center of the disc 1, from the center of the disc 1, and $h_a$ is the radial width of the image on the disc 1 of the increment of the work piece scanned by the hole 17a, as projected by the lens 23.

Figure 3:
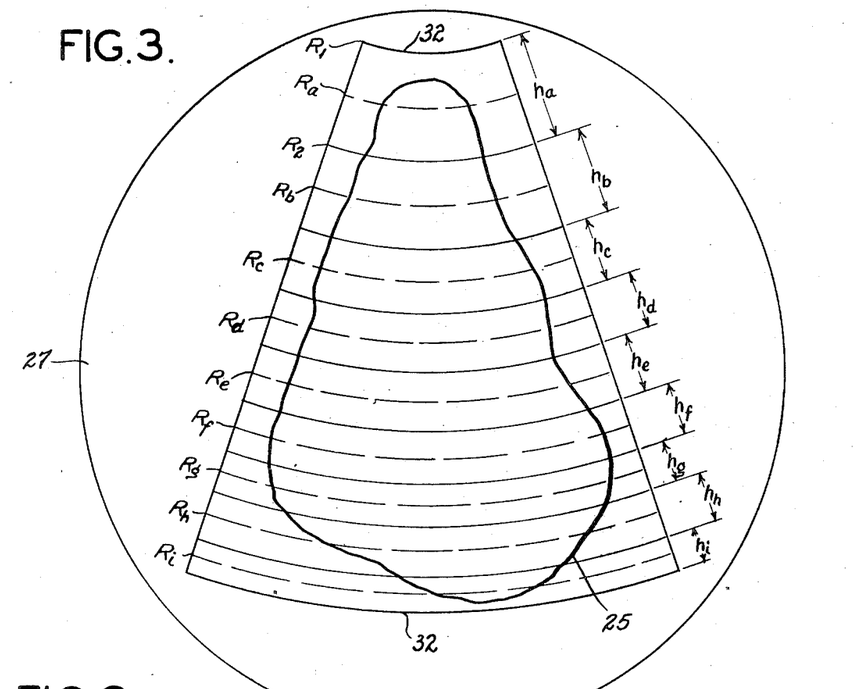
Fig. 3 is a diagrammatic vertical section taken substantially along line 3—3 of Fig. 1, showing a work piece, and the conical projection of a reflector on the plane of said work piece.

The application of this formula is seen more clearly by reference to Fig. 3, in which the broken light lines indicate the paths traversed by the spots of light on the work piece (or in an imaginary image of this system projected in reverse by the lens 23 on the scanning disc 1, the distances of the scanning holes 17 from the center of the disc 1), while the solid light lines indicate the limits of the increments of the work piece assumed to be scanned by the beams which produce the broken line paths between pairs of successive limits. The broken lines are radially midway, or median, between their surrounding solid lines. $R_a$ indicates the broken line corresponding to an innermost hole 17a on the scanning disc. $R_1$ and $R_2$ indicate the inner and outer limits, respectively, of the increment to be scanned by hole 17a. The radial difference between $R_1$ and $R_2$, designated as $h_a$, is therefore the width of the increment scanned by hole 17a.

In designing a scanning disc for a given piece of work to be measured, the values for $R_a$ and $h$, on the disc, are usually decided in advance. For example, $R_a$ may be given a value of 5.9159 inches. It is desired that the increment, on the work piece, have a width, say, of 6 inches. The particular lens system employed projects, say, a line 6 inches long on the work piece to an image 2.4510 inches long on the disc. This value, 2.4510 inches, is the value $h_a$ on the disc.

From the foregoing formula, the value for $R_b$, the distance of the next outer hole 17b from the center of the disc may now be calculated. This works out to be 8.0429 inches. The hole 17b will have an $h_b$ value, for its scanning beam, expressed as follows:

$$h_b = 2R_b - 2R_a - h_a$$

as may readily be proved. In the same example, $h_b$ works out to be equal to 1.8029 inches.

Figure 2:
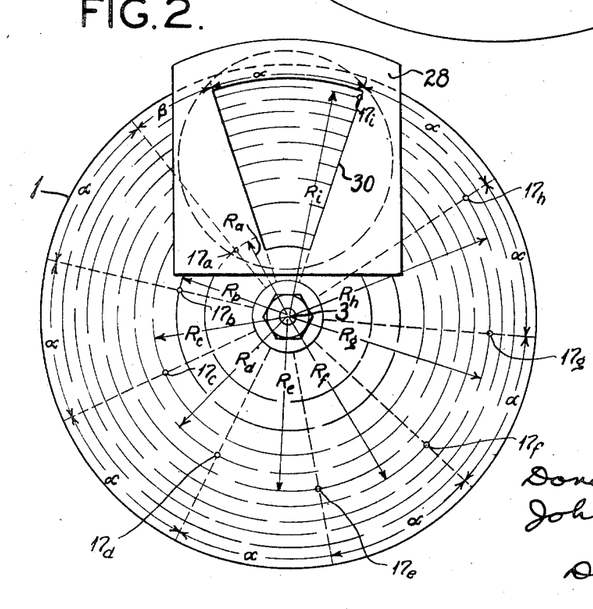
Fig. 2 is an enlarged diagrammatic vertical section of a typical scanning disc.

Fig. 2 shows, for illustrative purposes, a greatly simplified scanning disc 1 with but nine holes 17, which is laid out in the manner now being described.

From the known values of $R_b$ and $h_b$, as thus found, $R_c$ and $h_c$ can now be calculated by the same manner, using the same formulae. Similarly, and progressively, the values for $R_d$, $R_e$, $R_f$, $R_g$, $R_h$ and $R_i$, and for $h_d$, $h_e$, $h_f$, $h_g$, $h_h$, and $h_i$ may be calculated. The foregoing example works out to give the following values:

| | | |
|---|---|---|
| $R_a$ | 5.9159 | $h_a$ 2.4510 |
| $R_b$ | 8.0429 | $h_b$ 1.8029 |
| $R_c$ | 9.6923 | $h_c$ 1.4960 |
| $R_d$ | 11.0938 | $h_d$ 1.3070 |
| $R_e$ | 12.3351 | $h_e$ 1.1755 |
| $R_f$ | 13.4614 | $h_f$ 1.0772 |
| $R_g$ | 14.5000 | $h_g$ 1.0000 |
| $R_h$ | 15.4687 | $h_h$ 0.9374 |
| $R_i$ | 16.3800 | $h_i$ 0.8852 |

A scanning disc 1 laid out with the holes 17 spaced at distances calculated by the formulae hereinbefore set forth will thus scan equal areas in equal times in the system shown in Fig. 1, providing the angular speed of the disc 1 is constant. And, since the angular speed of the counter 44, when it runs, is at all times proportional to the angular speed of the disc 1, the angular speed of the disc 1 need not be constant, but may vary or change, without thereby introducing an error into the measurement.

While the accuracy of the formula given above may be mathematically proved, the proof is complex and need not be given herein. Suffice it to say that the principle involved is that the nearer a scanning hole to the center, the wider is the increment it is made to scan, which provides an automatic compensation for the fact that its linear speed on the work piece, relative to the angular speed of the counter 44, is lower. Thus the counter can indicate true areas.

The diameter of any hole 17 should be such that the spot it produces on the work piece is not greater in diameter than the width of the increment to be scanned thereby. In the drawings, the diameters of holes 17 are necessarily enlarged, relative to the diameter of the scanning disc 1, for clarity.

The angular spacing of the holes 17 from each other on the disc 1 may readily be calculated from the width of the work piece to be measured and the constants of the optical system employed. In the assumed nine-hole disc of Fig. 2, for example, each of the holes 17 is separated from its neighbor by an angular distance $\alpha$. This angle $\alpha$ is also the angle subtended by the sides of the sector-shaped aperture 30 in mask 28. In order to provide a "dead region" to prevent mechanical imperfections in the one-turn clutch mechanism 14 from impairing the accuracy of measurement, and for other reasons hereinafter set forth, a "dead angle" $\beta$ is provided, in addition to the angle $\alpha$, between the innermost hole 17a on the disc, and the outermost hole 17i on the disc.

Because of the relatively small number (nine) of holes which was assumed for sake of clarity in illustrating the method of designing the scanning disc 1, the angle $\alpha$ is relatively large in Fig. 2, necessitating a relatively large mask aperture 30, which in turn necessitate a relatively large lens system 21 and 23. However, in commercial practice the number of holes in the scanning disc will ordinarily be largely in excess of nine, (say, for example fifty or so) as shown in Fig. 10, and the angle $\alpha$ will consequently be relatively small, making it possible to use a smaller aperture 30 in the mask 28 and thus use lenses of more reasonable diameters, as indicated in Figures 1 and 10.

It is not necessary that the holes 17 be arranged in the spiral order shown. The scanning is just as effective, in measuring areas, if the increments are scanned in any order, as when they are scanned in a successive order from increment to increment. For example, the progression of the holes 17 around the disc might be 17c, 17a, 17i, 17h, 17d, 17b, 17g, 17e, and 17f, or any other order, without thereby affecting the accuracy of the measurement.

The dead angle $\beta$ is provided to eliminate measurement errors due to possible slight under-running or over-running of the one-turn clutch 14. The dead angle $\beta$ is defined as the minimum angle through which the shaft 3 must be turned after completion of the scanning by the last hole 17i, for example, in order to bring the hole 17a, for example, into position to begin scanning.

In the system described the relay 33 is so designed that when no light beam reaches the photo-sensitive device 29 the electromagnetic clutch 35 is energized and therefore shaft 7 is mechanically connected to shaft 41 so that if shaft 7 turns while no light beam reaches the photosensitive device 29 the counter 44 increases its reading. Not only during the times that light beams are intercepted by the work piece 25 does the photosensitive device 29 receive less light than is required to operate the relay 33 through the amplifier 31, but also during the time that the disc is rotating through the dead angle β, no light beam reaches the photosensitive device 29.

In order that the measurement of any one work piece be accurate, in that no one increment thereof is scanned more than one time during a measurement, and as an additional check on the accuracy of the one-turn clutch mechanism 14, the two accurate periodic timing devices 37 and 38 hereinbefore referred to are provided in the external electric circuit of the relay 33 and the electromagnetic clutch 35. The periodic timing devices 37 and 38, through relay 36, close the said external circuit precisely at the beginning of the scanning process, and open said external circuit precisely at the end of the scanning process. The periodic timing devices 37 and 38 are driven by the shaft 3 and electrically control relay 36, which relay 36 controls said external circuit.

Periodic timing devices are sufficiently well known to those skilled in the art that no detailed description is necessary herein. Said devices (see Figures 1 and 4) comprise relatively slowly-rotating pairs of slip rings 85 and 87, respectively, connected in series with relatively fast-rotating pairs of slip rings 89 and 91, respectively. The rings 89 and 91 are driven by shaft 3 through a gear train 93. Periodic timing devices of this character are often used in clocks, for example to close (or open) electrical circuits precisely at predetermined times once each hour, for example. In the first embodiment of the invention herein described the periodic timing device 37 is used to close the electrical circuit 95 of the "on" solenoid 97 of relay 36 once each time the shaft 3 has rotated through 360 degrees with an angular deviation from 360 degrees of 1 part in 2401, for example, and said device 37 is adjusted to close said circuit at the beginning of the scanning process, which is the time when the first light beam is permitted by the mask 28 to begin to sweep across the combination of reflector 27 and work piece 25. Periodic timing device 38 is identical with periodic timing device 37 but is used to close the electrical circuit 99 of the "off" solenoid 101 of the relay 36 at the end of the scanning process, which is the time when the last light beam has just completed its sweep across the combination of reflector 27 and work piece 25.

Figure 4:
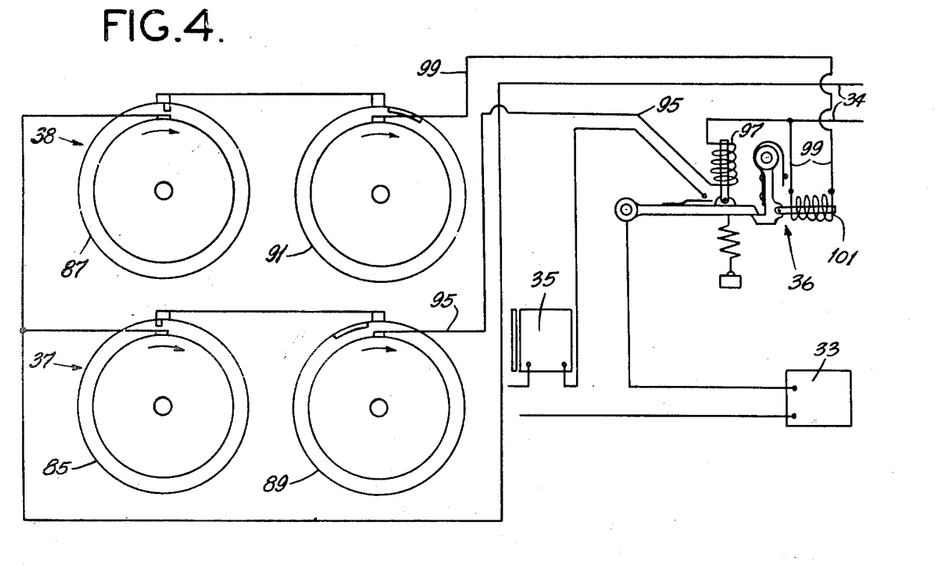
Fig. 4 is a diagram of certain periodic timing devices and their electrical connections.

Relay 36, as shown diagrammatically in Fig. 4, is a self-holding relay of the type commonly used with a push-button control to stop and start motors. Said relay 36 is so connected electrically to the periodic timing devices 37 and 38 that periodic timing device 37 closes the external electrical circuit of relay 33 and electromagnetic clutch 35 whereas periodic timing device 38 opens said external electrical circuit. A suitable source of power 34 is provided for both relays 33 and 36.

The function of the one-turn clutch mechanism 14 to be described in greater detail hereinafter, is to aid in preventing the measurement of a given work piece 25 more than once. In the system as shown in Fig. 1 the drive shaft 105 of the one-turn clutch 14 is continuously rotating, but driven shaft 3 rotates only one complete revolution and only after a manual operation has been performed. The one-turn clutch 14 is adjusted to start and stop the rotation of the shaft 3 when the leading edge of the region of the dead angle β on disc 1 has moved across the aperture 30 of mask 28 through at least an angle δ which will be more fully described hereinafter.

The construction of the one-turn clutch mechanism 14 is as follows:

The one-turn clutch mechanism 14 is shown in greater detail in Figures 5, 6, 7, 8 and 9, to which reference is now directed. The main drive shaft 105 is keyed to a rotating outer sleeve member 107. An inner cam member 109 is mounted for rotation within the sleeve member 107, and has peripheral recesses 111 for receiving rollers 113. The cam member 109 has a cylindrical portion 115, on which rotates a second sleeve 117. The sleeve 117 has a cylindrical retainer ring portion 119 which extends into the sleeve member 107 and retains the rollers 113. The sleeve 117 has a peripheral projection or stop 121.

Figure 5:
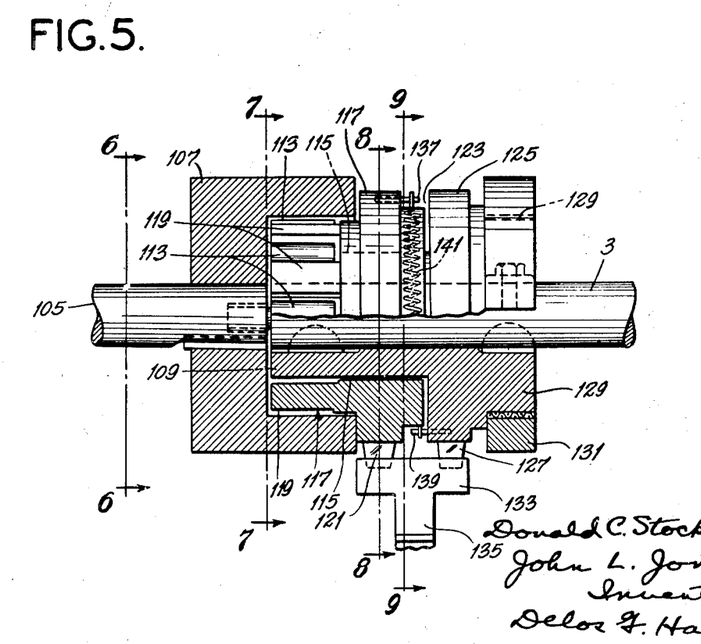
Fig. 5 is a longitudinal section, partly in elevation, of a one-turn clutch mechanism.
Figure 6:
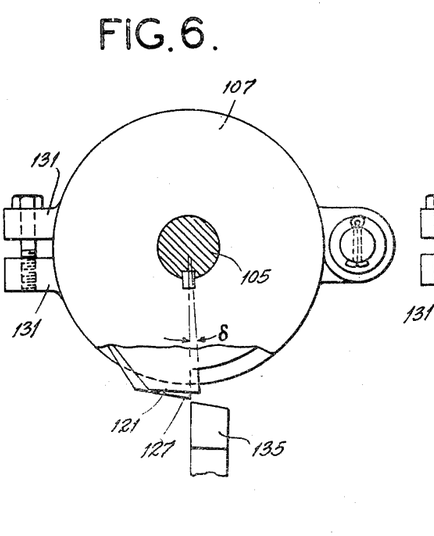
Figures 6, 7, 8 and 9 are cross sections taken substantially along lines 6—6, 7—7, 8—8, and 9—9, respectively, of Fig. 5; and, Fig. 10 is a diagrammatic vertical section taken substantially along line 10—10 of Fig. 1.
Figure 7:
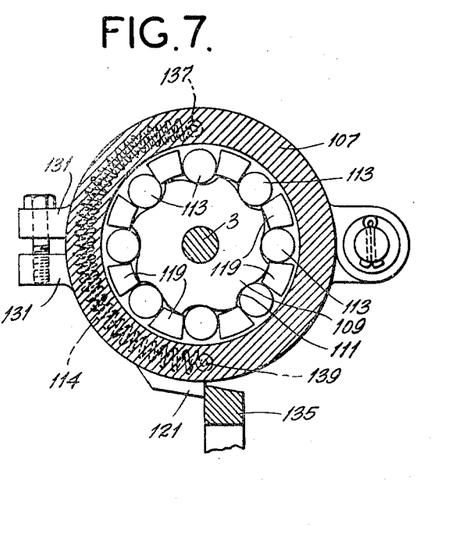
Figure 8:
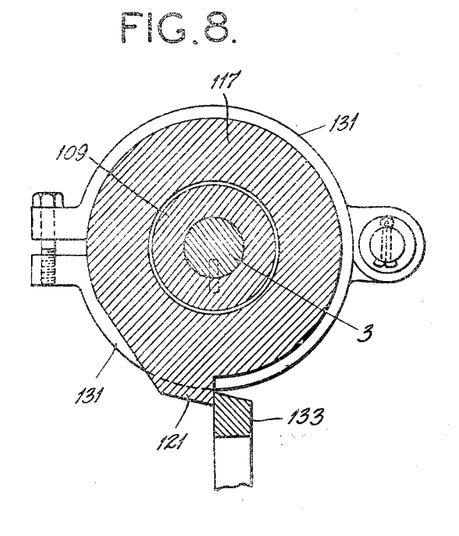
Figure 9:
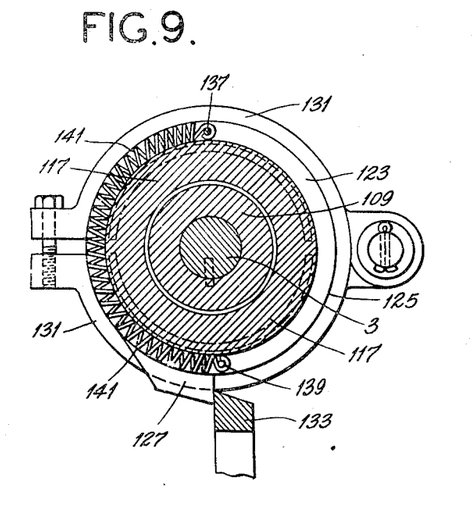

The cam member 109 is outwardly flanged beyond the end of the sleeve 117, providing a groove 123 therebetween, and a cylindrical part 125 beyond the groove 123. The cylindrical part 125 has a peripheral projection or stop 127. Beyond the cylindrical part 125 is another cylindrical part 129 of lesser diameter, said cylindrical part 129 forming the drum of a brake 131. This brake 131 can be used with relatively light pressure to aid in stopping the rotation of the cam member 109, but is adjusted in any case so that it does not prevent the stop 127 from making contact with an end 133 of the latch 135, hereinafter to be described. A pair of pins 137 and 139 are mounted, oppositely facing, on the cam member 117 and the sleeve 109 respectively, and a tension spring 141, lying in the groove 123, connects the two pins.

The driven shaft 3 is received in, and keyed to rotate with the cam member 109.

Numeral 135 indicates the hereinbefore-mentioned sliding latch that is supported for sliding movement in bearings 143 and 145. The latch 135 is provided with a handle 147 at its free end, and a tension spring 149 reacts between a collar 151 made fast to the latch 135, and the bearing 143 to cause the latch 135 to be normally in a retracted position such that the opposite end 133 of the latch 135 is positioned under the projection 121 on the sleeve 117, in such manner as to prevent the rotation of said sleeve 117 and is positioned under the projection 127 on the cam member 109 in such a manner as to prevent the rotation of the cam member 109.

Normally the sleeve 107 rotates continuously with the shaft 105, but the sleeve 117 and the cam member 109 cannot rotate with the sleeve 107 because the stops 121 and 127, respectively, are held back by the end 133 of latch 135. This holds the roller retainer 119 in such position that the rollers 113 are idling, being incapable of establishing a driving connection between the sleeve 107 and the cam member 109 and the angle subtended by the stops 121 and 127 at the axis of the shaft 3 is zero. However, the instant the latch 135 is manually moved out of locking position, by pulling the knob 147, the spring 141, reacting against the inertia of the moving parts of the scanning apparatus and against the friction of the various bearings in the scanning apparatus such as the bearing of shaft 3, for example, rotates the sleeve 117 enough forward so that the retainer 119 brings the rollers 113 into a driving connection between the sleeve 107 and the cam member 109 the angle of rotation of the sleeve 117 being δ which angle is small relative to the dead angle β on the disc 1.

The cam member 109 thereupon commences to rotate, carrying the sleeve 117 and shaft 3 with it and the angle subtended by the stops 121 and 127 is the displacement angle δ. Meanwhile, the knob 147 has been released, permitting the latch 135 to return to a locking position, so that, immediately upon the completion of a single revolution, the sleeve 117 is stopped by the re-engagement of the stop 121 with the end 133 of latch 135. The stopping of the sleeve 117 moves the retainer 119 so that the rollers 113 are again brought to idling position. The rotation of the cam member 109 ceases when the stop 127 on cam member 109 engages the end 133 of latch 135. The excess rotation of the cam member 109 relative to the rotation of the sleeve 117 stores tension in the spring 141 for the next revolution. Since the mechanical conditions are substantially identical for successive operations, the revolution of the cam member 109, and hence of the shaft 3, is substantially one turn for each manual operation of the knob 147.

It is evident, however, that should the one-turn clutch 14 become worn after long use and consequently occasionally turn through an angle greater or less than 360 degrees, no error in the area measurement can result, because the maximum angle δ through which sleeve 117 can rotate, relative to the shaft 3, is a small angle relative to the dead angle β of the disc 1, and the one-turn clutch 14 is adjusted to start and stop the shaft 3, when the leading edge of the region of dead angle β on disc 1 has moved across the aperture 30 of mask 28 through the angle δ. The one-turn clutch 14 cannot rotate through an angle less than 360 degrees minus δ because said clutch 14 must continue to rotate with the shaft 105, after release of the stops 121 and 127 through temporary manual withdrawal of the end 133 of the latch 135, until the stop 121 has again arrived at the end 133 of the latch 135, at which instant the angle between the stops 121 and 127 is δ, and the angle of rotation of the one-turn clutch 14 is therefore at least 360 degrees minus δ, and thereafter the shaft 3 must rotate enough further relative to the sleeve 117 to release the rollers 113 from their contact with the cam member 107.

The same features of design, which prevent the rotation of the one-turn clutch 14 through an angle less than 360 degrees minus δ, also prevent the rotation of the one-turn clutch through an angle greater than 360 degrees plus δ. Rotation of the one-turn clutch 14 through an angle greater than 360 degrees can result only from initial displacement of the sleeve 117 relative to the cam member 109 through an angle less than δ, before the release of the stops 121 and 127 through the temporary manual withdrawal of the end 133 of the latch 135, and from final displacement of the sleeve 117 relative to the cam member 109 through an angle less than said initial angle.

Rotation of the one-turn clutch 14 through an angle greater than 360 degrees can result in no error in area measurement because said rotation is positively stopped before the entire region of the dead angle β on disc 1 has passed across the aperture 30 of mask 28.

Angular deviations of the rotation of the one-turn clutch 14 from one complete turn cannot accumulate to exceed an angle greater than δ, in either direction, during any number of scanning cycles because the angular position of the latch 135 about the axis of the shaft 3 is fixed, and contact of the stop 121 with the end 133 of the latch 135 is a necessary condition for both starting and stopping the rotation of the one-turn clutch 14.

Thus it is clearly shown that the operation of the one-turn clutch 14 cannot produce an error in the measurement of area because the starting and stopping of the rotation of the shaft 3 always occur at instants when the disc 1 is in such an angular position that the region of the dead angle β on disc 1 is coming up to scanning position, and no hole 17 is in position, relative to the mask 28, to scan. In addition, the external electrical circuit of the relay 33 and the electromagnetic clutch 35 is held open by the periodic timing devices 37 and 38 during the period that the region of the dead angle β on disc 1 is crossing the aperture 30 of mask 28.

The operation of the system as thus described, and as shown in Fig. 1, in order to measure the area of a work piece 25, is as follows:

The motor 13 is started, thus commencing the rotation of the shaft 105. The lamp 19 is turned on, so that the production of scanning beams can be commenced. The latch 135 is in its locking position, so that the shaft 3, and all moving parts driven by shaft 3 are stationary. The electromagnetic clutch 35 is electrically disconnected from the relay 33 by relay 36. The work piece 25, the area of which it is desired to measure, is now placed in position in front of the reflector 27. Thereupon, the knob 147 is pulled, and the one-turn clutch 14 permits the shaft 3 to begin making one revolution. At the beginning of the scanning the relay 36 electrically connects the electromagnetic clutch 35 to the relay 33. During the one revolution of the shaft 3, a complete series of scanning beams, produced during the one revolution of the scanning disc 1, is produced, and each scanning beam actuates the photosensitive device 29 in accordance with its interception or non-interception by the work piece 25. During this interval, the electromagnetic clutch 35 is under direct control of the relay 33, which is in turn under direct control of the photosensitive device 29. In the system as described, this control means that whenever the scanning beam is intercepted by the work piece 25, the electromagnetic clutch 35 is energized so that the shaft 40, as driven by shaft 3 through gears 39, drives the shaft 41, and hence drives the counter 44, thus accumulating a measurement of the area of the work piece. However, if the scanning beam is reflected to the photo-sensitive device 29, then no current flows to the electromagnetic clutch 35, and the shaft 40 does not drive the counter 44, and no totalizing occurs. At the completion of the scanning the relay 36 electrically disconnects the electromagnetic clutch 35 from the relay 33. At the completion of the one revolution of the one-turn clutch 14 the shaft 3 stops rotating.

It is thus seen that, through the operation of the one-turn clutch 14, the number of scanning beams for any one work piece 25 that are effectual to operate the counter 44 is limited to one complete set of scanning beams, and no repeat of measurement of one or more increments of the work piece 25 can take place. It is also thus seen that, through the operation of the periodic timing devices 37 and 38 the counter 44 is automatically prevented from increasing its reading when no scanning is taking place even if the shaft 3 is rotating.

Many of the devices shown in the drawings may readily be replaced by other devices performing the same functions in the system. For example, the reflector 27 instead of being spherical may be made up of a plurality of relatively small, properly positioned plane mirrors. The electromagnetic clutch 35 and counter 44, constituting the integrating mechanism of the apparatus illustrated, may be replaced as below indicated, or may have any other form, such as an electrically operated ratchet motor. The one-turn clutch 14 may be replaced by any other device which will perform the same function.

The photosensitive device 29 may be of any type of sufficient sensitivity for the purposes required.

As stated hereinbefore the size and position of the reflector 27 are such that the conical projection of the scanned area on the plane of the work piece 25 does not extend beyond the conical projection of the reflector 27 on the plane of the work piece 25, said scanned area being limited by the aperture 30 of mask 28. If the action of the relay 33 is reversed so that the electromagnetic clutch 35 is mechanically connected to the counter 44 when any scanning beam is reflected to the photosensitive device 29, the conical projection of the scanned area on the plane of the work piece 25 can be evaluated by operating the area measuring apparatus in the usual manner when no work piece 25 is in position to intercept scanning beam light. With the action of the relay 33 still reversed in said manner the area of a work piece 25 can be found, after operating the area measuring apparatus in the usual manner with the work piece 25 in position for measurement, by subtracting the observed area from the known value of the conical projection of the scanned area on the plane of the work piece 25. This involves no change in the principles of the invention as it merely means designating the uncovered conical projection of the scanned area on the plane of the work piece 25 as the area to be measured, and for convenience said method of determining the area of a work piece 25 may be called "the subtraction method."

If the subtraction method of area measurement is used certain modifications in the design of the reflector 27 may be made advantageously. For example, if the reflector 27 is made of a discontinuous type, wherein reflecting areas alternate with areas not reflecting sufficient light to the photosensitive device 29 to actuate it, the light received by the photosensitive device will be pulsating, and the output of the amplifier 31 is an alternating current which may be rectified and used to operate an integrating mechanism controlled by direct current, or which may be used without rectification, if at a suitable frequency, to actuate a self-starting synchronous clock-type motor as an integrating mechanism. The same effect may be achieved with a continuously reflecting mirror 27 by making the light source 19 operate intermittently, or by placing a continuously operating shutter or light chopper in such a position as to interrupt the scanning beams.

It may here be pointed out that photosensitive devices are essentially detectors of radiation. Thus, the radiations usable in the present invention are not confined to visible light rays but may include supersonic waves, infra-red rays, and ultra-violet rays, providing these radiations are not harmful to the material being measured, and provided suitable radiation detectors are used. All such radiations are comprehended to be within the scope of the term "light" as herein used.

One of the principal objects of the present invention is to attain high accuracy in the measurement of area. It is readily understood that the accuracy of measurement of any quantity, such as area, is limited by the precision with which the various parts of the measuring apparatus function and is limited by the manner in which the measuring apparatus is used. It is also readily understood that perfect measurements of any quantity, such as area, are impossible to make, and that commonly the operator of the measuring apparatus realizes that there is always present a minimum error in a measurement of the quantity, said error being caused by imperfections in the design or/and construction of the apparatus and by imperfect methods of use of the apparatus. As an example, in the measurement of length with the aid of a common steel rule or scale the accuracy of the measurement is limited by a number of factors such as imperfections in the lay-out of the lines on the scale, the resolving power of the eye which may be determined, for example, by the quality of the eyesight or by the quality of the illumination, the fineness and proximity of the rulings, and the care with which the scale is used.

Since many errors may enter into the measurement of any quantity it is necessary to reduce each error to such a magnitude that the maximum resultant error is not greater than the allowable error set by some predetermined accuracy which suffices.

In commercial practice it is usual to define the error in terms of the maximum magnitude of the quantity which can be measured so that, for example, if the maximum length L which a device can measure in a single complete measurement is 10 inches the maximum relative error may be expressed as 0.1 per cent. of 10 inches, so that any one observed length may differ from the true length by as much as 0.01 inch, regardless of whether the actual length is 0.1 inch or 10 inches, for example.

In the measurement of a quantity by a series of steps, such as the measurement of the individual areas of different parts of a surface and then adding together the results of the separate measurements, there are three types of errors which must be taken into consideration, viz., random errors, constant errors and periodic errors. Random errors, such as might result from backlash in a mechanical linkage or in a gear train, often have a tendency to cancel one another but in many cases they do not cancel one another completely and therefore should be reduced as much as possible by precision construction. Constant errors may be due to incorrect proportionality between speeds of moving parts, for example, or failure of the counter to record the last unit in a series of units being integrated, for example. Constant errors are generally easily eliminated or rendered negligible through correct design. Periodic errors are those which periodically repeat themselves, usually in a predictable manner, such as change in speed due to distorted gears, and such errors may or may not tend to cancel one another depending on the part of the measuring apparatus in which they appear and on their frequency, and should in general be eliminated as nearly completely as possible directly or indirectly, by precision construction.

It is to be understood that in designing the herein described area measuring apparatus due attention has been paid to all potential sources of error and that many of the features of the invention have been introduced for the purpose of reducing the cumulative error to such an extent that the measurement of area may be made with a degree of accuracy hitherto unattainable with commercial area measuring machines. Although great care has been exercised in the design of the hereinbefore described embodiments of the invention, it is assumed and expected that equally great care will be exercised in the construction and use of the area measuring apparatus.

In the hereinbefore described embodiment of the invention, sources of measurement error lie in the optical system, including the lenses 21 and 23 and the disc 1, and in the linear speeds of the scanning beams as they sweep across the work piece 25 relative to the angular speed of the shaft 43 of the counter 44. The lenses 21 and 23 are preferably of such high quality that the images of the holes 17 in the disc 1 on the work piece 25 are sharply defined and the median lines of the paths $R_a$, $R_b$, $R_c$, etc. of said images on the work piece 25 are true arcs of circles having radii which are proportional to the radii of the respective holes 17. The holes 17 in the disc 1 are precisely located both angularly and radially and the thickness of the disc around each hole 17 is made as small as practicable, as by grinding, for example.

The linear speeds of the scanning beams as they sweep across the work piece 25 relative to the angular speed of the shaft 43 of the counter 44 are determined by a number of factors in addition to those which have been discussed in detail hereinbefore. The relative linear speeds of the scanning beams are affected by all types of speed errors in the moving parts of the apparatus beyond the one-turn clutch 14 such as the gears 39, for example, and by vibration and accidental movement of the scanning apparatus, or of parts thereof, which may produce a movement of the light beam across the work piece 25 and so cause false measurement. The relative speed errors of moving parts are eliminated as nearly completely as possible through precision construction of the component parts and any residual errors are reduced as required by any of the methods well known to and commonly used by instrument makers skilled in their art. Random speed errors are eliminated as nearly completely as possible through precision construction and through rigidity of mounting of all parts such as the lenses 21 and 23, the mask 28 and the bearings of the shaft 3, for example. Backlash error of all moving parts such as the gears 39, for example, is reduced to a minimum through precision construction and through the introduction of the brakes 12 and 47 on the shafts 3 and 43, respectively. Rotating parts, such as the disc 1, are statically balanced to prevent unwanted rotation due to the force of gravity.

It is important that the distance of work pieces 25 from the lens 23, measured along the axis of the lens 23, be constant and correct and that the plane of work pieces 25 be parallel to the plane of the disc 1 because otherwise serious measurement errors may result. For the same reason it is important that the distance of the disc 1 from the lens 23, measured along the axis of the lens 23, be constant and correct, and to insure this condition all lengthwise displacement of the shaft 3 is prevented by suitable thrust bearings 9 and 11.

None of the requirements hereinbefore mentioned for attaining high accuracy of area measurement is to be considered as a limitation of said accuracy, because the layout and construction of the apparatus is simple and straightforward and the required precision of design and construction of the apparatus falls within the limits of precision normally encountered in the design and construction of high grade chronometer mechanism and high grade motion picture projectors, for example.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

We claim:

1. A scanning disc containing a spiral arrangement of beam-controlling scanning holes, in which the distance ($R_b$) of any one hole from the center of the disc is related to the distance ($R_a$) of the next inward hole on the spiral substantially according to the formula:

$$R_b = \frac{\sqrt{2(R_a + \tfrac{1}{2}h_a)^2 - (R_a - \tfrac{1}{2}h_a)^2} + R_a + h_a}{2}$$

where $h_a$ is the equivalent radial width, on the disc, of the path scanned by the said next inward hole.

2. A scanning disc containing a spiral arrangement of beam-controlling holes, in which the radial distance between adjacent holes progressively increases as the distance of the holes from the center of the disc decreases.

3. Area measuring apparatus of the class described, comprising a light source, a rotating scanning disc having spirally arranged holes spaced at inwardly progressively increasing radial distances from each other, said holes defining beams from said source successively traversing the surface to be measured describing concentric circular paths on the surface, a photosensitive device for detecting the lengths of said paths on said surface, and area integrating means under the control of said photosensitive device.

4. A scanning disc having a plurality of beam-controlling scanning holes, in which the distance ($R_b$) of any one hole from the center of the disc is related to the distance ($R_a$) of the next-nearest hole to the center of the disc substantially according to the formula:

$$R_b = \frac{\sqrt{2(R_a + \tfrac{1}{2}h_a)^2 - (R_a - \tfrac{1}{2}h_a)^2} + R_a + \tfrac{1}{2}h_a}{2}$$

where $h_a$ is the equivalent radial width, on the disc, of the path scanned by the said next-nearest hole.

5. A scanning disc as set forth in claim 4, in which the holes are disposed at substantially uniform angular distances apart, except for two holes, which are spaced apart a greater angular distance than any two of the remaining holes.

DONALD C. STOCKBARGER.
JOHN L. JONES.